Sept. 9, 1969   E. B. DONNER   3,465,868
SINGLE FILE COLUMN FORMING APPARATUS
Filed Sept. 18, 1967   2 Sheets-Sheet 1

INVENTOR
Edmund B. Donner
BY
Wood, Herron & Evans
ATTORNEYS

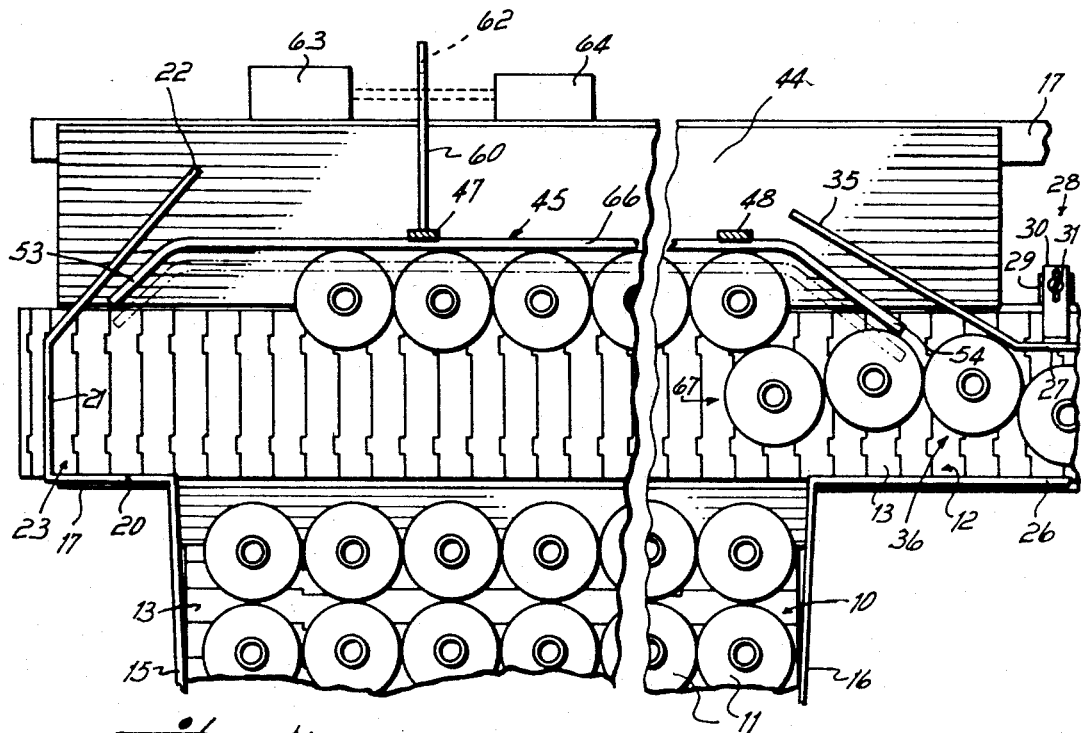
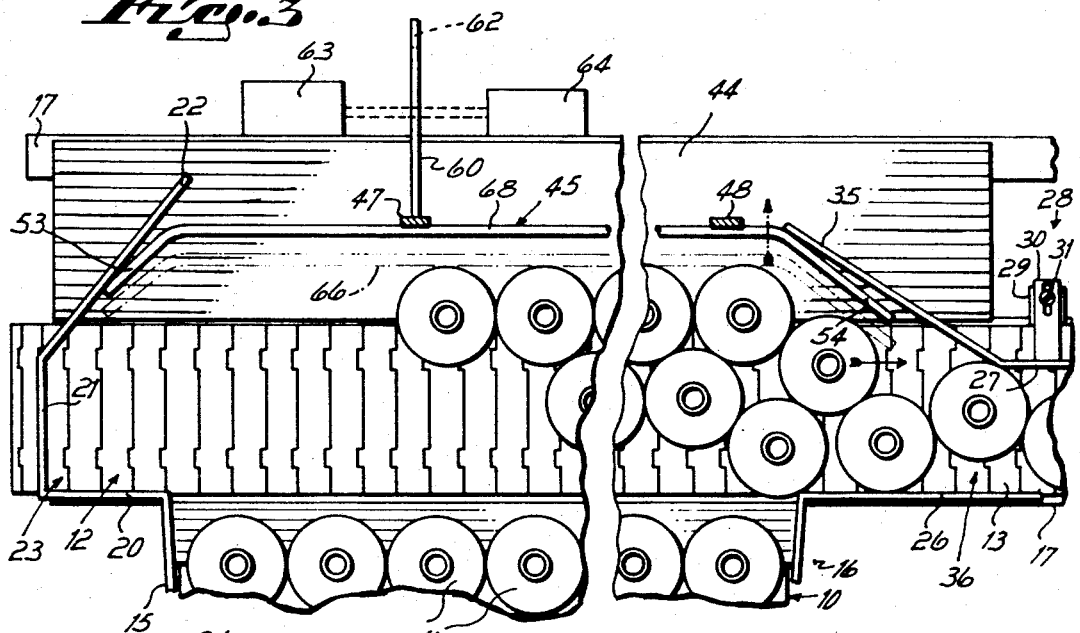

United States Patent Office 3,465,868
Patented Sept. 9, 1969

3,465,868
SINGLE FILE COLUMN FORMING APPARATUS
Edmund B. Donner, Washington, Pa., assignor to Solar Engineering & Equipment Company, Beaver, Pa., a corporation of Pennsylvania
Filed Sept. 18, 1967, Ser. No. 668,327
Int. Cl. B65g 47/30
U.S. Cl. 198—30
9 Claims

ABSTRACT OF THE DISCLOSURE

An apparatus for feeding bottles in a single file column from a group of randomly arranged bottles on a bulk feed conveyor. The bulk feed conveyor is controlled for automatic or demand feeding of the bottles onto an output conveyor on which the bottles are fed through a tapered throat and thus formed into a single file column. A combination backstopping bar and bottle guide controls the feed of bottles onto the output conveyor and, through its displacement, relieves bottle jams which occur during the forming of the bottles into a single file column on the output conveyor.

BACKGROUND OF THE INVENTION

In modern automated bottle manufacturing or processing plants, the processing of bottles is effected continuously on numerous machines or apparatus formed into a continuous line and interconnected by automatic feeding conveyors. Examples of such machines might be bottle forming machines, decorating machines, washing machines, filling machines, etc. Because these machines are all joined together in a continuous line, they are all interdependent in the sense that a breakdown of one necessitates the shutdown of the remainder. In order to minimize this interdependence, and to accommodate differing processing rates of the different machines, the normal practice in the industry is to form a reservoir of bottles on the conveyors between the different machines. In other words, a single file of bottles is fed out of one machine and before being fed into the next machine, is fed into a large bank or reservoir out of which the bottles are then fed in a single file column to the next machine. Thus, a breakdown in one machine or a jam in one of the conveyors does not effect a complete shut down of a whole factory unless the breakdown persists for an extended period of time.

The bottles in the banks or reservoirs between the machines are not usually arranged in any particular order. As the speeds of operation of automatic processing plants have increased, the apparatus for moving the bottles out of the randomly arranged reservoirs and into continuous single file columns has increasingly become a bottleneck in the plant operation. Specifically, the apparatus has become subject to increasingly frequent jams because of the demand for increased flow rate. To date, the only available solution to this problem of jam frequency has been to station an attendant at each reservoir so that he could spot and manually break a jam so as to maintain a constant or nearly constant flow of bottles out of each reservoir.

Therefore, it has been a primary objective of this invention to provide an automatic apparatus for feeding bottles in a single file row out of a bank or reservoir of randomly arranged bottles. To accomplish this objective and maintain the continuity of the row, the apparatus of this invention is self clearing in the event of a jam bottles in the apparatus.

This invention is predicated in part upon the concept of feeding the randomly arranged bottles through a throat, at least one side of which is movably mounted so that upon the occurrence of a jam in the throat, the jam is automatically self clearing because of a dimensional change or opening of the throat.

More specifically, the present invention contemplates a bulk infeed conveyor and a single file output conveyor arranged transversely to the infeed conveyor. Bottles are precluded from being fed across and off the output conveyor by a movable backstopping bar or guide, one section of which extends partially across the output conveyor and cooperates with a stationary guide to define a throat through which the bottles are transported and formed up into a single file column. Because the backstopping bar or guide is movably mounted, it is free to move away from the stationary guide and open the throat in the event of a jam of bottles in the throat. In addition to serving as a backstop, the movably mounted bar also controls movement of the bulk infeed conveyor. When displaced to an intermediate position, the bar stops the feed of the bulk infeed conveyor onto the filing or output conveyor and thus reduces the probability of a jam as a consequence of excessive pressure on the bottles located on the filling or output conveyor.

These and other objectives and advantages of this invention will be more readily apparent when considered in connection with the following detailed description of a preferred embodiment of the invention in which:

FIGURE 3 is a top plan view of the single file column forming apparatus of FIGURE 1 taken on line 3—3 of FIGURE 2.

FIGURE 4 is a view similar to FIGURE 3 but illustrating a bottle jam and the manner in which it is cleared.

Figure 1:
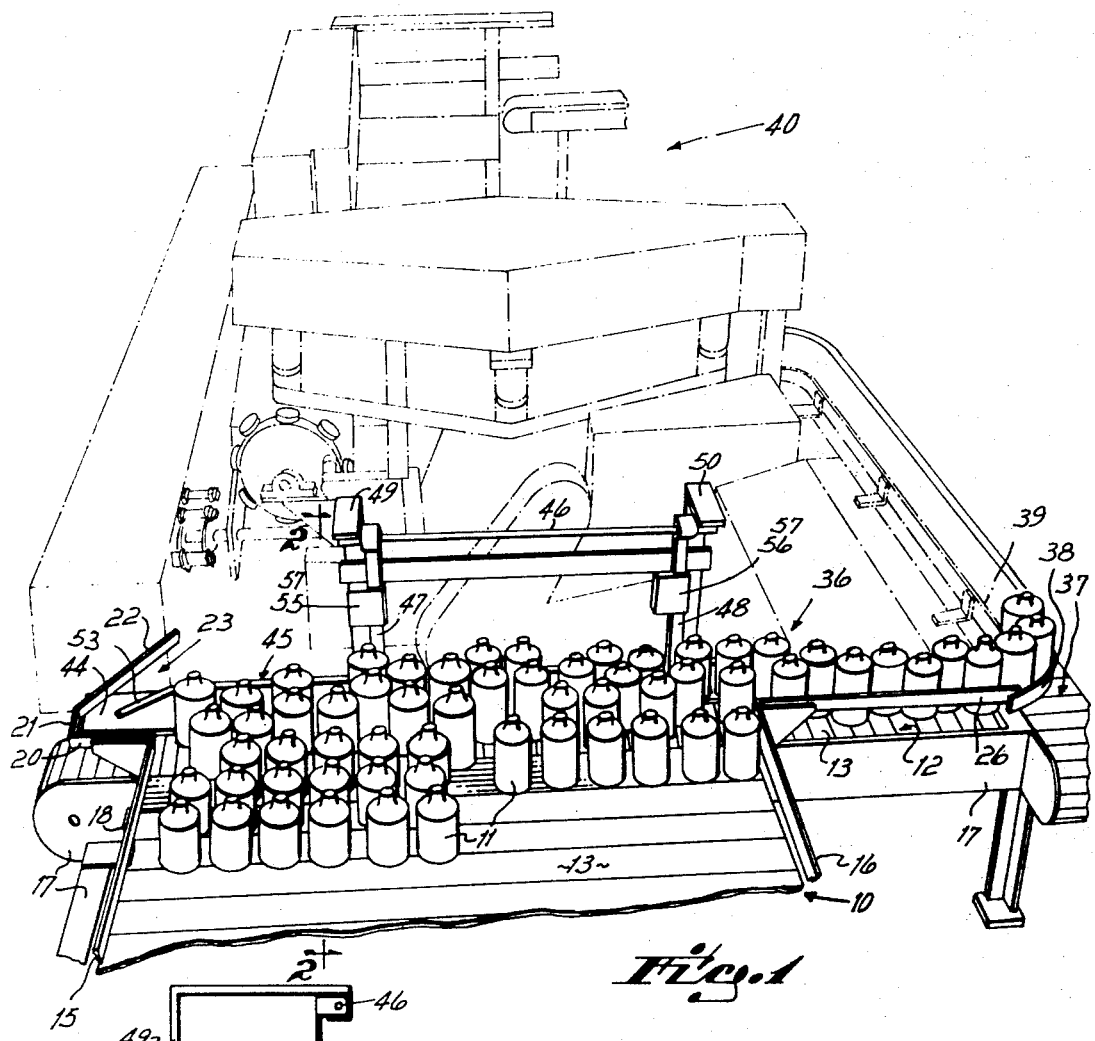
FIGURE 1 is a perspective view of a bottle single file column forming apparatus employing the principles of this invention and showing in phantom a bottle decorating machine with which this apparatus may be associated.

Referring first to FIGURE 1, there is illustrated a preferred embodiment of the single file bottle forming apparatus of the invention. This apparatus comprises a bulk feed conveyor 10 for supplying randomly arranged bottles 11 onto an output conveyor 12. The output conveyor 12 is located in juxtaposition to and extends transversely across the downstream end of the bulk feed conveyor 10. Both conveyors are conventional endless belt type conveyors having a plurality of articulately interconnected plates 13 forming the conveyor surface over which the bottles are frictionally fed.

The bulk feed conveyor 10 is an intermittent motion conveyor, driven by an electric motor (not shown) in response to opening and closing of an automatic control switch as is explained more fully hereinafter. Output conveyor 12 is a continual motion conveyor driven by an electric motor (not shown) which operates the conveyor continuously until manually turned off.

To retain bottles 11 on the bulk feed conveyor 10, a pair of stationary guide rails 15 and 16 are located along the transverse marginal edges of the conveyor 10. These guide rails 15, 16 are secured to the machine frame 17 by a plurality of guide support brackets 18 and define a slightly tapered bottle flow path over the conveyor 10. This tapered flow path is slightly narrower at the upstream end than at the downstream end so that the bottles 11 cannot become jammed between the two rails 15 and 16.

At the downstream terminal end of the guide rail 15, it has a transverse section 20 located over the transverse edge of the output conveyor 12, a forwardly extending section 21 and a forwardly angulated section 22. These three sections define a recess or pocket 23 over the trailing or upstream end of the output conveyor 12 operable to retain bottles upon that area of the conveyor 12.

The guide rail 16 on the opposite side of the conveyor 10 is bent at a right angle adjacent the intersection of the two conveyors 10, 12 so as to define a guide section or rail 26 located over one transverse edge of the output conveyor 12.

Another guide rail 27 extends parallel to the end section 26 of the guide rail 16 and is adjustably secured over the downstream end section of the transverse edge of the conveyor 12. The adjustable mounting 28 for the guide rail 27 comprises stationary brackets 29 fixedly secured to the frame 17 and connected to the rail 27 by slotted movable brackets 30 which are adjustably secured to the stationary brackets 29 by bolts 31.

As may be seen in FIGURE 3, the upstream end section 35 of the guide rail 27 is angled outwardly to form one side of a tapered throat 36. The opposite side of the throat 36 is formed by the section 26 of the guide rail 16.

After passing through the throat 36 on the output conveyor 12, a single row of bottles may be transported through a network of other conveyors 37 and appropriate guide rails 38 and 39 to an associated bottle handling apparatus. By way of example and for illustrative purposes only, the single file column former is shown as supplying a column of bottles to a bottle decorating machine 40. Since the decorating machine 40 forms no part of this invention, it is shown only in phantom lines.

Located forwardly of the output conveyor 12 and in the same horizontal plane is an overflow shelf 44 fixedly secured to the machine frame 17. This shelf receives bottles which are forced over the output conveyor 12 by the following flow of forwardly moving bottles on the feed conveyor 10.

A movable backstopping bar 45 is located over the shelf 44 on a position to block continued forward movement of the bottles over and off the shelf. This bar 45 is pivotally suspended from an overhead support shaft 46 by a pair of support arms 47, 48. The shaft 46 is, in turn, supported or carried by a pair of inverted L-shaped brackets 49 and 50 which extend upwardly from and are attached at their lower ends to the frame 17.

Figure 2:
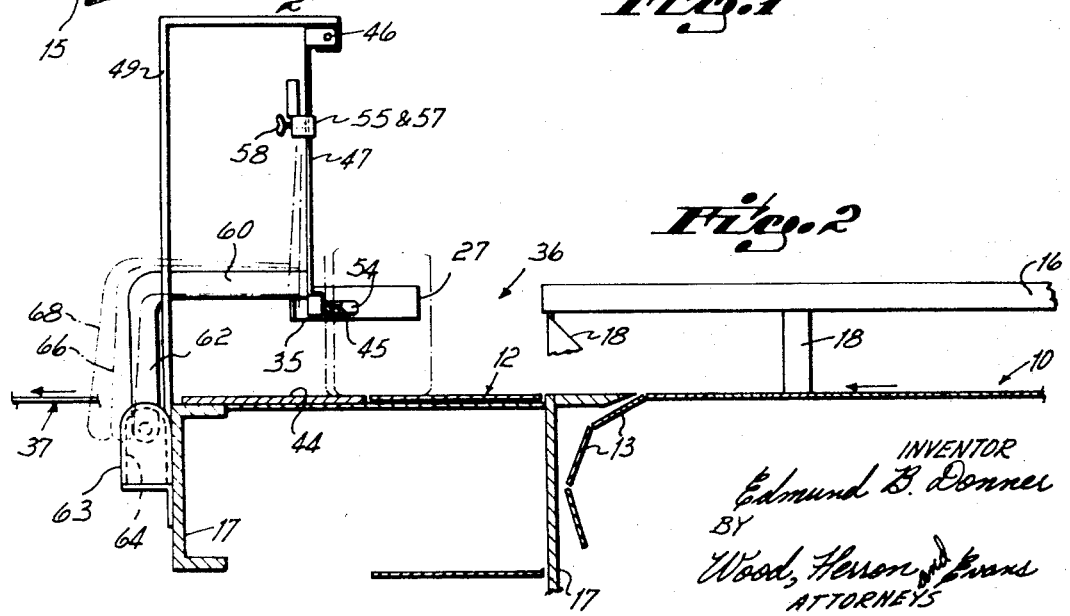
FIGURE 2 is a diagrammatic cross-sectional view taken generally along lines 2—2 of FIGURE 1 and illustrating the three operative locations of the movable bottle backstopping bar and guide.

Referring now to FIGURES 1, 2 and 3, it will be seen that the movable backstopping bar 45 is welded or otherwise rigidly fixed to the lower ends of the pivotally movable support arms 47, 48. At its outer ends, 53, 54, the bar 45 is angulated or bent rearwardly so as to extend generally parallel to the end sections 22 and 28 of the guide rails 15, 27, respectively.

To control the force required to move the backstop bar 45 rearwardly, a pair of balance weights 55, 56 are adjustably secured to the guide support arms 47 and 48. These weights 55, 56 are mounted upon slide blocks 57 which are vertically slideable on the arms 47 and 48 and are secured thereto by wing screws 58.

One of the guide support arms 47 has a rearwardly extending bracket 60 secured to its lower end. This bracket 60 has a depending leg portion 62 at its forward end which serves as a light beam interrupter to control movement of the feed conveyor 10 as is explained more fully hereinafter.

An electric beam transmitter or photocell transmitter 63 is mounted upon the frame 17 on one side of the leg 62 of bracket 60 and a photocell receiver 64 is mounted on the opposite side of the leg 62.

In operation, the leg 62 of the bracket 60 normally hangs down between the sending and receiving units 63, 64 so as to break the light beam between the two units. The leg 62 of the bracket 60 is shown in this position in solid lines in FIGURE 2. So long as this light beam is broken, an appropriate electrical control circuit is operable to complete a circuit to the electric motor which drives the feed conveyor 10. Since the control circuit per se forms no part of the invention of this application and could readily be supplied by a person skilled in the electrical control arts, it has not been illustrated in detail herein.

When approximately two rows of bottles have been moved from the bulk feed conveyor 10 onto the output conveyor 12 and the overload shelf 44 (see FIGURE 3), the bottles abut against the backstopping bar 45 so that continued feeding movement of the conveyor 10 results in rearward displacement of the backstopping bar 45 and the attached depending leg 62 of the bracket 60. After the bottles have moved the backstopping bar 45 and the attached bracket a predetermined distance (to the position illustrated by the phantom line 66 in FIGURES 2 and 4) the leg 62 of the bracket 60 moves out of the light beam of the photocell transmitter 65. This results in the control circuit to the drive motor of the feed conveyor 10 being opened so that the feed conveyor is stopped. The feed conveyor then remains stopped while the output conveyor 12 moves the second row of bottles 67 on the output conveyor through the throat 36 in a single file column. As the bottles on the output conveyor are fed through the throat, the bottles on the overload shelf are pushed forwardly by the backstopping bar 45 off the shelf 44 onto the output conveyor 12. After the bar 45 has moved forward a sufficient distance to again break the light beam of the photocell transmitter 63, the control circuit actuates the drive motor of the feed conveyor 10 so as to feed a new supply of bottles onto the output conveyor.

If while the backstopping bar 45 is in its rearward position as designated by the numeral 66, a jam of bottles should occur at the mouth 36, the end section 54 of the bar 45 which defines part of the throat is forced rearwardly to a jam relief position (designated by the phantom line 68 in FIGURE 4), thereby opening the throat to clear the jam and permit continued single file movement of the bottles through the throat.

The vertical position of the adjustable weights 56 determines the force required to push the backstopping bar 45 forwardly and the return force which the bar then maintains against the bottles to push the bottles off the overload shelf and back onto the output conveyor 12. Otherwise expressed, the lower the weights 55, 56 are positioned on the arms 47 and 48, the greater is the force exerted by the bar 45 against the bottles on the overload shelf 44 tending to push the bottles back onto the conveyor 12. Preferably, the weights 55, 56 are so positioned on the arms 47 and 48 that when more than three bottles are positioned half on the conveyor 12 and half on the shelf 44, they exert sufficient force against the bar to hold the back-stopping bar in a forward position 66 out of the light beam. With this setting, when only three bottles remain to be fed through the mouth 36 on the overload conveyor, the bar 45 is shifted so as to again interrupt the beam and start the bulk feed conveyor 10 and move another batch of bottles onto the output conveyor and the shelf 44.

While only a single preferred embodiment of my invention has been illustrated and described herein, those persons skilled in the arts to which this invention pertains will readily appreciate numerous changes and modifications which may be made without departing from the spirit of my invention. Therefore, I do not intend to be limited except by the scope of the appended claims.

Having described my invention, I claim:

1. Apparatus for forming a group of randomly arranged bottles into a continuous single file column, said apparatus comprising:

a first movable conveyor for feeding a group of randomly arranged bottles in a first direction, a second movable conveyor located adjacent the downstream end of the first conveyor, said second conveyor extending transversely across the downstream end of said first conveyor and being operable to transport bottles in a second direction normal to said first direction, a network of guide rails for maintaining said bottles on said conveyors, said network of guide rails including a pair of converging guide rails located over said second conveyor and defining a throat through which the bottles pass and are formed into a single file row on said second conveyor, at least one of said pair of converging guide rails being movably mounted so that a jam of bottles in said throat effects movement of said movable rail so as to clear said jam, said network of rails including a backstopping rail located on that side of said second conveyor which is remote from said first conveyor, said backstopping rail being mounted for movement toward and away from said first conveyor in response to contact with bottles forced across said second conveyor by movement of other bottles on said first conveyor, and control means for stopping and starting movement of said first conveyor in response to movement of said backstopping rail.

2. The apparatus of claim 1 wherein said movable rail of said throat and said movable backstopping rail are a unitary assembly movable together toward and away from said first conveyor.

3. The apparatus of claim 1 wherein the pressure required to move said backstopping bar is adjustable.

4. The apparatus of claim 1 wherein said movable backstopping bar is supported from above by at least one pivotally suspended bar, said pivotally suspended bar having a weight adjustably mounted thereon whereby the vertical position of said weight on said bar controls the force required to move said backstopping bar away from said first conveyor.

5. The apparatus of claim 1 wherein said control means includes a photocell positioned in the path of travel of said backstopping bar.

6. Apparatus for forming a group of randomly arranged bottles into a continuous single file column, said apparatus comprising:

a first movable conveyor for feeding a group of randomly arranged bottles in a first direction, a second movable conveyor located adjacent the downstream end of the first conveyor, said second conveyor extending transversely across the downstream end of said first conveyor and being operable to transport bottles in a second direction normal to said first direction, a network of guide rails for maintaining said bottles on said conveyors, said network of guide rails including a pair of converging guide rails located over said second conveyor and defining a throat through which the bottles pass and are formed into a single file row on said second conveyor, said network of rails including a backstopping rail located on that side of said second conveyor which is remote from said first conveyor, said backstopping rail being mounted for movement toward and away from said first conveyor in response to contact with bottles forced across said second conveyor by movement of other bottles on said first conveyor, and control means for stopping and starting movement of said first conveyor in response to movement of said backstopping rail.

7. The apparatus of claim 6 wherein the pressure required to move said backstopping bar is adjustable.

8. The apparatus of claim 6 wherein said movable backstopping bar is supported from above by at least one pivotally suspended bar, said pivotally suspended bar having a weight adjustable mounted thereon whereby the vertical position of said weight on said bar controls the force required to move said backstopping bar sway from said first conveyor.

9. The apparatus of claim 8 wherein said control means includes a photocell positioned in the path of travel of said backstopping bar.

References Cited

UNITED STATES PATENTS 1,852,322　4/1932　Loew _____ 198—32

EDWARD A. SROKA, Primary Examiner

U.S. Cl. X.R.

198—32